Patented Nov. 11, 1924.

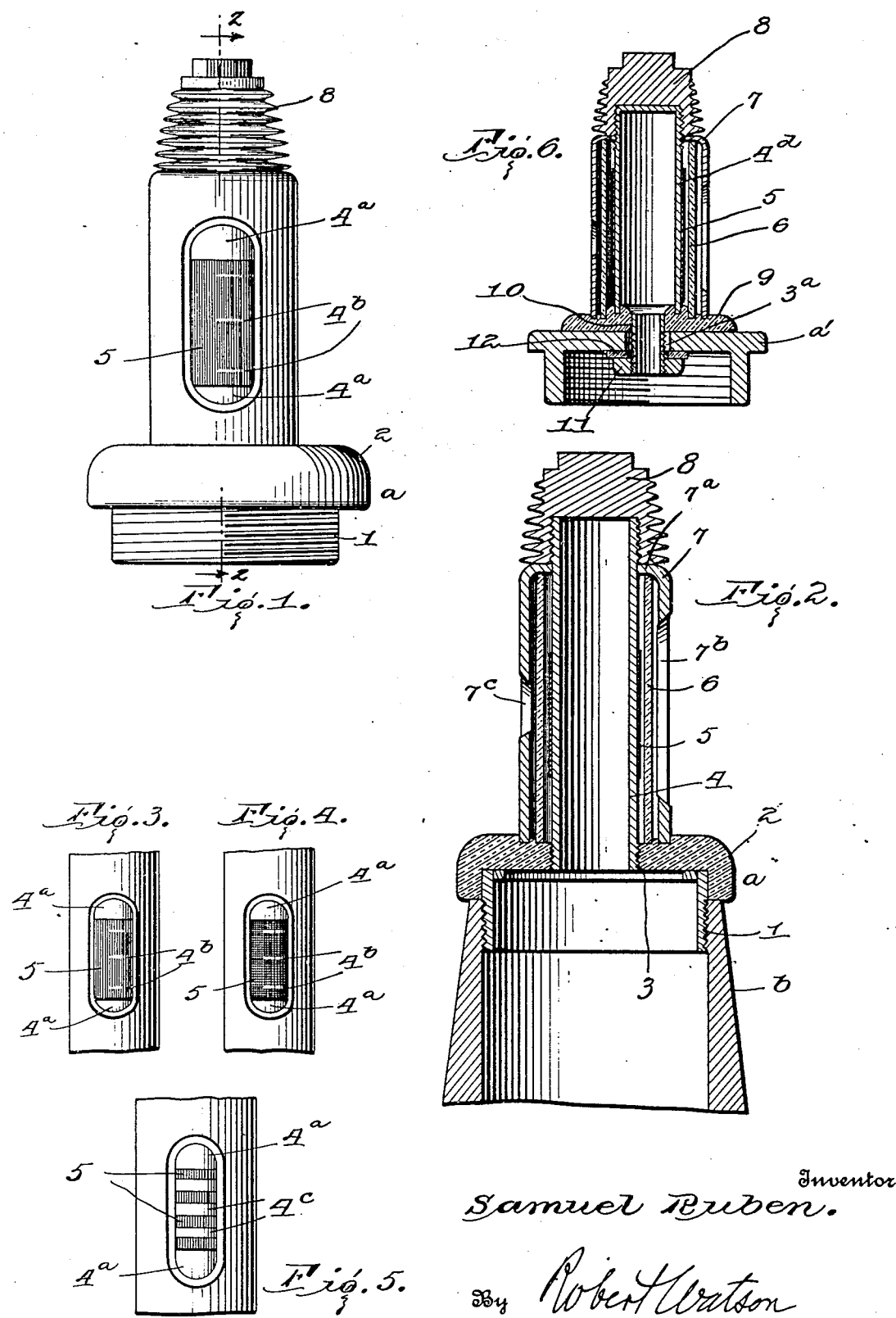

1,515,222

UNITED STATES PATENT OFFICE.

SAMUEL RUBEN, OF NEW YORK, N. Y.

TEMPERATURE INDICATOR FOR INTERNAL-COMBUSTION ENGINES.

Application filed July 11, 1921, Serial No. 483,803. Renewed April 25, 1924.

*To all whom it may concern:*

Be it known that I, SAMUEL RUBEN, a citizen of the United States, residing at New York, in the county of New York and State of New York, have invented certain new and useful Improvements in Temperature Indicators for Internal-Combustion Engines, of which the following is a specification.

This invention relates to temperature indicators, for indicating the temperatures in the radiators of internal combustion engines having water cooling systems. In carrying out the invention, I provide a cap for the radiator, having a central opening, and upon the cap and thermally insulated from the metal parts of the radiator is arranged a hollow metal body, preferably in the form of a relatively thin metal tube, which is in communication with the interior of the radiator through the opening in the cap. This body has a coating of material which undergoes a marked change in color with a change in temperature, and the body with its coating is visible from the driver's seat, so that the driver may be advised by observing the color of the coating on the body of any undue heating of the engine. Preferably, this tube is enclosed in a transparent casing, to prevent the coating on its surface from becoming soiled, and this casing, in turn, is protected from mechanical injury by an outer casing which may be of molded heat insulating material, formed with a suitable sight opening, and if desired, an opening to permit the circulation of air around the transparent casing. I also provide, especially for motors having the thermo-siphon system of water circulation, a metal cap for the coated tube, which cap is exposed to the atmosphere at all times and radiates heat from the tube. This cap equalizes the temperature of the coated tube, preventing sudden changes but allowing the temperature of the tube to rise with prolonged overheating of the water in the radiator.

In the accompanying drawing,

Fig. 1 is a rear elevation of the radiator cap equipped with my temperature indicator;

Fig. 2 is a section on the line 2—2 of Fig. 1, the filling tube of an automobile radiator also being shown in central section;

Fig. 3 is a front elevation of the part of the indicator shown in Fig. 1, the changeable coating on the metal tube being lined to indicate red, which may be the color of the coating at normal radiator temperature;

Fig. 4 is a similar view, showing the coating lined to indicate a contrasting color, black, which may be the color of the coating at excessive radiator temperature;

Fig. 5 is a similar view, showing the changeable coating with bars of red, separated by permanent bars of white, the red bars being changeable to black upon abnormal rise in temperature in the radiator; and, Fig. 6 is a central vertical section through a modified form of indicator, attachable to any radiator cap.

Referring to Figs. 1 to 5, inclusive, of the drawing, *a* indicates a radiator cap of any suitable design, adapted to fit the filling tube *b* of an automobile radiator. In the drawing, this cap is represented as composed of a threaded metal ring 1, and a body portion 2 of heat insulating material. The body portion has a central opening 3, into which is threaded or otherwise suitably secured a relatively thin metal tube 4, which extends vertically above the cap and has its lower end open so that the interior of the tube will be in communication with the interior of the radiator when the cap is on a radiator. Upon the outer surface of this tube and covering its central portion is a coating 5 of material which undergoes marked change in color with change in temperature of the tube, the thickness of the coating being exaggerated in Fig. 2. Thus, according to the composition of the coating material, the change may be from yellow to red or from red to black, with rise in temperature, the reverse changes in color taking place when the temperature of the tube falls. The remainder of the tube is coated with material which does not undergo change in color with change in temperature, such as ordinary white paint, and which contrasts with both of the colors of the changeable color-coating. Thus, in Figs. 3 and 4, the parts 4ᵃ of the tube above and below the coating 5 are preferably painted white, and white lines or graduation marks 4ᵇ may be painted on the tube at different points in the length of the coating. In Fig. 5, the changeable material coating is represented as bars or rings of red extending around the tube and separated by bars 4°, of material of a contrasting and unchangeable color, such as ordinary white paint. For clearer visibility from the driver's seat, the barred arrangement shown in Fig. 5 is preferred. These bars also serve as graduation marks which show rising and falling temperature in the tube, since the changes in temperature take place more or less gradually from end to end of the tube. As a color-changing material for coating the tube, I prefer to use a compound of mercuric and copper iodides, which changes from red to a decided black when heated, but other compounds may be used, such for instance as a compound of silver and mercuric iodides, which changes from yellow to red upon rise in temperature.

The metal tube 4 is enclosed in a transparent tube 6, preferably of glass, to keep the coating on the metal cap clean, and the glass tube is protected against mechanical injury by a tube 7, of molded composition which is a non-conductor of heat. The tube 7 is spaced from the tube 6 to allow of the circulation of air between the tubes, and the tube 7 has an inwardly turned flange 7ª at its upper end which extends over the upper end of the glass tube. A metal cap 8 is threaded on to the upper end of the metal tube 4 and bears upon the shoulder 7ª of the casing 7 and thus holds the casing and the glass tube in position about the metal tube. The composition casing has a sight opening 7ᵇ, of suitable size, through which the coating on the metal tube may be seen, and it is also preferably provided with a smaller opening 7ᶜ, at the opposite side of the casing to permit air to flow through the casing from the opening 7ᶜ to the opening 7ᵇ. The glass tube and the enclosing casing rest upon suitable surfaces on the cap and the casing can be adjusted about its axis to change the position of the sight opening with respect to the location of the driver's seat, as desired.

In operation of the device thus far described, when the temperature in the top of the radiator rises to such a point as to indicate over-heating of some of the engine parts, the metal tube will be heated by the steam or vapor which passes from the upper part of the radiator into the tube, and this will cause a readily visible change in the color of the coating on the metal tube. If, now, the engine is stopped and the water in the radiator cools down, the metal tube will lose its heat and the color of the coating on the tube will change back to normal. The metal cap 8, which is exposed to the atmosphere at all times and is connected to the metal tube, conducts heat from said tube and this heat is radiated from the cap. A sudden rise in temperature in the radiator, which might be caused by some temporary but not abnormal working condition of the engine, might cause the tube to heat and show a decided change in color if it were not for the exposed metal cap, which serves as a temperature equalizer and prevents sudden changes in temperature of the tube. However, prolonged overheating, due to some abnormal working of the engine, would gradually cause the tube as well as the cap to become hot and the coating would change color.

In Fig. 6, I have shown an ordinary metal cap $a'$, through which is bored a central opening 3ª, and the temperature indicating device is in the form of an attachment which can be readily applied to or removed from the cap. As shown, the indicating tube 4ᵈ is mounted upon a base of heat insulating material 9, and this base has a central opening in which is secured a short metal tube or nipple 10, which projects through the opening in the cap $a'$. This base of insulating material is removably secured to the cap by a nut 11, which is threaded on to the nipple 10 and bears against a washer 12, of insulating material, which is interposed between the nut and the underside of the body of the cap. The lower end of the tube 4ᵈ is imbedded in the insulating material 9 and is concentric with the nipple 10 so that the interior of the tube will be in communication with the interior of the radiator through the nipple 10, when the cap is applied to the radiator. As in the previously described figures, this indicating tube has the coating 5 of changeable color material and the tube is enclosed in a glass tube 6, which, in turn, is enclosed in a casing 7 of heat insulating material, and the parts are held in position by a metal cap 8, threaded on to the metal tube.

It will be evident that by removing the nut 11, the base 9 and the entire indicating device may be removed from the cap. It will also be evident that the device may be applied to any ordinary cap by boring a hole in the cap to receive the nipple 10. The tube in Fig. 6, as in Figs. 1 and 2, is insulated from the metal parts of the cap, so that it is not affected by conduction of heat through said parts. The operation of the device shown in Fig. 6 is the same as that described in connection with Figs. 1 and 2, so that further description of the operation is unnecessary.

What I claim is:

1. In a temperature indicator for internal combustion engines, the combination with a radiator cap having an opening therethrough, of a hollow metal body mounted on the cap and having an opening registering with the opening in the cap, said body having an exterior coating of material which changes color with changes in temperature.

2. In a temperature indicator for internal combustion engines, the combination with a radiator cap having an opening therethrough, of a hollow metal body mounted on the cap and having an opening registering with the opening in the cap, said body having an exterior coating of material which changes color with changes in temperature, a casing enclosing said body but leaving said coating exposed to view, and a heat radiating body attached to said hollow body and exposed to the atmosphere.

3. In a temperature indicator for internal combustion engines, the combination with a radiator cap having an opening therethrough, of a metal tube mounted on the cap and having an opening registering with the opening in the cap, said tube having a coating of material which changes color with changes in temperature, and a heat radiating cap on said tube.

4. In a temperature indicator for internal combustion engines, the combination with a radiator cap having an opening therethrough, of a metal tube mounted on heat insulating material on said cap and having an opening registering with the opening in the cap, said tube having a coating of material which changes color with changes in temperature.

5. In a temperature indicator for internal combustion engines, the combination with a radiator cap having an opening therethrough, of a metal tube mounted on heat insulating material on said cap and having an opening registering with the opening in the cap, said tube having a coating of material which changes color with changes in temperature, a casing enclosing said tube but leaving said coating exposed to view, and a heat radiating cap on said tube outside the casing.

6. In a temperature indicator for internal combustion engines, the combination with a radiator cap having an opening therethrough, of a metal tube having an opening registering with the opening in the cap, and having a coating of material which changes color with change in temperature, a transparent tube surrounding the metal tube, a housing surrounding both of said tubes and having a sight-opening and a heat radiating cap on the metal tube outside the housing.

7. In a temperature indicator for internal combustion engines, the combination with a radiator cap having an opening therethrough, of a metal tube having an opening registering with the opening in the cap and having a part of its surface coated with material which changes color with change in temperature and an adjacent part coated with material which remains constant in color with changes in temperature.

8. In a temperature indicator for internal combustion engines, the combination with a radiator cap having an opening therethrough, of a metal tube having an opening registering with the opening in the cap, and having a part of its surface coated with material which changes color with change in temperature and an adjacent part coated with material which remains constant in color with changes in temperature, the color of said latter material contrasting with the several colors of the first mentioned material.

9. In a temperature indicator for internal combustion engines, the combination with a radiator cap having an opening, of a body of heat insulating material having a nipple secured thereto, said nipple extending through said opening and securing the insulating material to the cap, a metal tube mounted on said material and having an opening registering with the nipple and having a coating of material which changes color with change in temperature, an enclosure for said tube having a sight-opening, and a radiator cap mounted on the upper end of the tube outside the closure.

In testimony whereof I affix my signature.

SAMUEL RUBEN.